(12) United States Patent
Schwebke (10) Patent No.: US 6,601,817 B2
(45) Date of Patent: Aug. 5, 2003

(54) FISHING ROD HOLDER DEVICE

(76) Inventor: Stephen K. Schwebke, P.O. Box 32329, Apalachicola, FL (US) 32329

( * ) Notice: Subject to any disclaimer, the term of this patent is extended or adjusted under 35 U.S.C. 154(b) by 0 days.

(21) Appl. No.: 10/073,633

(22) Filed: Feb. 11, 2002

(65) Prior Publication Data

US 2002/0139916 A1 Oct. 3, 2002

Related U.S. Application Data

(60) Provisional application No. 60/268,121, filed on Feb. 12, 2001.

(51) Int. Cl.[7] .................................................. A01K 1/12
(52) U.S. Cl. ...................................................... 248/534
(58) Field of Search ................................ 248/534, 538, 248/218.4, 219.4, 230.8; 43/21.2

(56) References Cited

U.S. PATENT DOCUMENTS

| | | | | |
|---|---|---|---|---|
| 3,815,273 A | * | 6/1974 | Perkins ........................ 43/25.2 |
| 3,992,798 A | * | 11/1976 | Schmitt, Sr. ................... 43/17 |
| 4,156,982 A | * | 6/1979 | Phillips, Jr. ................... 43/21.2 |
| 4,297,802 A | * | 11/1981 | Normann ......................... 43/4 |
| 4,587,757 A | * | 5/1986 | Lirette ........................ 43/21.2 |
| 5,561,937 A | | 10/1996 | Johnson ....................... 43/21.2 |
| 5,813,162 A | * | 9/1998 | Tse et al. ..................... 43/21.2 |
| 5,915,942 A | | 6/1999 | Ratliffe ....................... 43/21.2 |
| 5,956,883 A | * | 9/1999 | Krouth et al. ................. 43/21.2 |
| 5,975,479 A | | 11/1999 | Suter .......................... 248/534 |
| 6,029,872 A | * | 2/2000 | Ellington ..................... 224/251 |
| 6,129,251 A | * | 10/2000 | Lajoie ......................... 224/197 |
| 6,141,898 A | * | 11/2000 | Shelton ....................... 43/21.2 |

* cited by examiner

Primary Examiner—Leslie A. Braun
Assistant Examiner—Kofi Schulterbrandt
(74) Attorney, Agent, or Firm—Carnes Cona & Assoc.

(57) ABSTRACT

A fishing rod holding device is disclosed and is comprised of a flexible base having straps secured to its opposite ends. The straps include conventional locking devices. Extending outwardly from the base is a rigid and durable substrate. Extending through the substrate, at the front area is at least one groove and extending through a side of the substrate is an additional groove. In use, the present invention is designed and configured to be quickly and efficiently removably secured to any horizontal or vertical support, such as a pier, bridge or boat railing or the like. Thereby providing for the groove located at the front area of the substrate to be ideally suited for when the device is secured to a horizontal support. The groove located on the side being ideally suited for when the device is secured to a vertical support.

11 Claims, 7 Drawing Sheets

FISHING ROD HOLDER DEVICE

This is a utility Patent Application for Provisionally File Application No. 60/268,121 filed on Feb. 12, 2001.

BACKGROUND OF THE INVENTION

1. Field of the Invention

The present invention relates generally to a holding device designed and configured to maintain an elongated object, specifically a fishing rod, and more particularly to a holding device that is adapted to be removeably secured to any size or shaped pier railing, horizontal support system and/or vertical support system so as to prevent the item being held, such as a fishing rod and reels from being pulled or knocked down, such as in the water, by a fish, person, or the like, as well as to relieve the fisherman from continuously holding the rod.

2. Description of the Prior Art

Fishing is a recreational activity enjoyed by many. Fortunately, fishing is one of many recreational activities that can be enjoyed in many different settings and environments. For example, a fisherman can fish from a boat, pier, land, or wading in the water. Fishing is a challenging sport that many will wait for hours in order to get the perfect catch. As is known in the fishing arena, the importance of utilizing a fishing pole holder can prevent rod and reel loss, as well as to offer relief for fisherman, by eliminating the need to continuously hold the rod. To aid in this end, numerous fishing pole holder devices exist in the prior art. For example, in U.S. Pat. No. 5,915,942 issued to Ratliffe there is disclosed a multifunctional fishing rod holder used in securing a fishing rod to a boat, pier or other support structure. In order to provide for such a configuration, Ratliffe includes an elongated tubular housing, for receiving a fishing pole, having a shepherd's hook secured to one side and eyelets secured oppositely therefrom. This arrangement will enable the elongated tubular housing to be affixed to a vertical structure via the hooks or strapped around a pole by enabling a strap to extend though the eyelets.

Another example is seen in U.S. Pat. No. 5,561,937 issued to Johnson. This patent discloses a fishing rod holder comprised of an elongated hollow pole housing a strap to be wrapped under the bridge and a triangular support brace positionable to a bridge rail for securement thereto.

Yet another example can be seen in U.S. Pat. No. 5,975,479 issued to Suter. This patent discloses a fishing rod holder to be removeably attached to the gunwale of a small boat. A C-clamp device is used for removably attachment and a unique holder is secured to this C-clamp for supporting the pole and reel.

As evidence a variety of fishing pole holder devices exits and many are utilized and, as such, are well known. These numerous fishing rod holder devices are out on the market in a variety of forms and configurations so as to provide for holding devices which are suited to a consumer's particular needs and desires. Intrinsically, the current fishing pole holder devices tend to be limited in use by providing for a device that must be attached to either a vertical or horizontal support, not a combination thereto. Those that do offer the option of either vertical or horizontal placement have a tendency to be complex in nature and thus many deter the fisherman from its use.

Since the current fishing pole holder devices on the market are limited in their scope and use, it is seen that there is a necessity for a holder simple in design. Accordingly, it can be seen that there exists a need for an apparatus, which will not only act as a fishing rod holder, but will also allow the user numerous applications, such as provide for a holder that allows for either horizontal or vertical placement. Such an apparatus should be simple in construction and compact in size, so as to provide a device that is not only successful, but can efficiently and effectively be utilized by any individual regardless of age, physical ability or dexterity.

Accordingly, it is seen that none of these previous efforts provide the benefits intended with the present invention, such as identified above. Additionally, prior techniques do not suggest the present inventive combination of component elements as disclosed and claimed herein. As will be seen, the present invention achieves its intended purposes, objectives and advantages by accomplishing the needs as identified above, through a new, useful and unobvious combination of component elements, which are simple to use, with the utilization of a minimum number of functioning parts, at a reasonable cost to manufacture, assemble, test and by employing only readily available material.

SUMMARY OF THE INVENTION

The present invention is a fishing holding device designed and configured to be quickly and efficiently removably secured to any horizontal or vertical support, such as a pier, bridge or boat railing or the like. In this structure, the present invention will include attaching capabilities that enables either vertical attachment or horizontal attachment. When in the vertical or horizontal position, the present invention will include receiving instrumentality for accepting and maintaining a fishing rod in an angled and upright position. The receiving instrumentality will be located on the device so that it can maintain a fishing rod regardless of if the holding device is secured in a vertical or horizontal position.

To provide for such a configuration, the present invention includes a flexible support having a rear wall and a front wall. The rear wall will be contacting the particular vertical/horizontal support while secured to the front wall is a substrate. The substrate extends outwardly from the front wall and is fabricated from a rigid and durable material.

Extending through the front of the substrate is a first groove or channel. This first groove or channel is designed and configured to receive and maintain a fishing rod when the base is secured to a horizontal structure and thus is the receiving instrumentality for horizontal placement of the holding device. A second groove or channel extends through a side wall. This second groove or channel is designed and configured to receive and maintain a fishing rod when the base is secured to a vertical structure and thus is the receiving instrumentality for vertical placement of the holding device.

For adequately receiving a vertical or horizontal support, the base is fabricated from a flexible yet resilient material. This will provide for a base that can contour to the shape of the particular support. The resilient material will inherently possess anti-skidding properties so as to prevent the base from slipping therefrom. The substrate is secured to the base. The area above or on a side of the substrate is a first section and the area below or on the opposite side of the substrate is a second section. This will provide for the base to include a first section and a second section. Secured to the first section is a first attaching device and second to the end of the second section is a second attaching device which is adapted to mate with the first attaching device. These attaching devices are conventional, and thus can be any type or form. Straps secured by way of stainless steel rings to the base have been used, wherein each end of the straps include mateable locking devices, such as buckles, hook and loop material, known as Velcro or the like.

Hence, to utilize the present invention, the user selects the desired support for maintaining the present invention. The support can be any vertical or horizontal structure. Once selected, the user places the rear wall of the base against the support so as to provide for the substrate to be facing outwardly therefrom. The attaching devices are wrapped around the particular support and locked into place via the respective mating locking devices. Once in place, the user casts their rods and the rods are maintained within the respective groove or channel.

Enhancing the present invention can be achieved by providing an aperture to extend from the top surface of the support to the bottom surface of the support. This aperture can act as a holding device and can be used for maintaining a flashlight or the like.

Other features can further be added, for example notches can be located in proximity to each channel. These notches can maintain the line (outrigger clip) of the fishing rod. An additional strap can be included and its purpose is to be secured around fishing rod. Thereby providing for the strap to maintain the rod. Hooks, additional grooves or the can be located on or extend through the substrate for receiving other necessities, such as lures, sunglasses, or the like for when a user is fishing. In addition, a magnet or the like can be secured to any side wall for enabling metallic items, such as a knife, or the like, to be maintained thereon.

Accordingly, it is the object of the present invention to provide for a fishing rod holder device which will overcome the deficiencies, shortcomings, and drawbacks of the prior holder devices and methods thereof.

Another object of the present invention is to provide for a fishing rod holder device that is designed and configured to successfully and effectively be secured quickly to any horizontal or vertical support system.

Still a further object of the present invention is to provide for a fishing rod holding device that is portable, compact and can be operated with ease of attachment and removal.

Yet another object of the present invention is to provide for a fishing rod holding device that alleviates the problems associated with fishing rods and reels accidentally being pulled or knocked into the water by a fisherman or fish.

An additional object of the present invention is to provide for a holding device that will successfully maintain a fishing rod while preventing abrasion to both the line and the rod.

Another object of the present invention, to be specifically enumerated herein, is to provide a fishing rod holding device in accordance with the preceding objects and which will conform to conventional forms of manufacture, be of simple construction and easy to use so as to provide a device that would be economically feasible, long lasting and relatively trouble free in operation.

Although there have been many fishing rod holding devices, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention taken in conjunction with the accompanying drawings.

BRIEF DESCRIPTION OF THE DRAWING

Similar reference numerals refer to similar parts throughout the several views of the drawings.

DESCRIPTION OF THE PREFERRED EMBODIMENT

In reference to the drawings, in particular to FIGS. 1–6, the present invention, a fishing rod holding device, denoted by reference numeral 10, will be described. As seen through out the figures, the fishing rod holding device 10 is designed and configured to be secured to either a horizontal support (see FIGS. 3a, 3b and 4a) or to a vertical support (see FIG. 4b), successfully, quickly and efficiently. Once secured thereto, the present invention can adequately maintain a conventional fishing rod. Further, the present invention is designed to be compact, so that it can easily be stored and transported when desired.

To provide for such a configuration, the present invention 10, as seen throughout the drawings, includes a substrate 12 that is secured to a base 14. Once secured, the substrate 12 will extend outwardly and away from the base 14.

Figure 1:
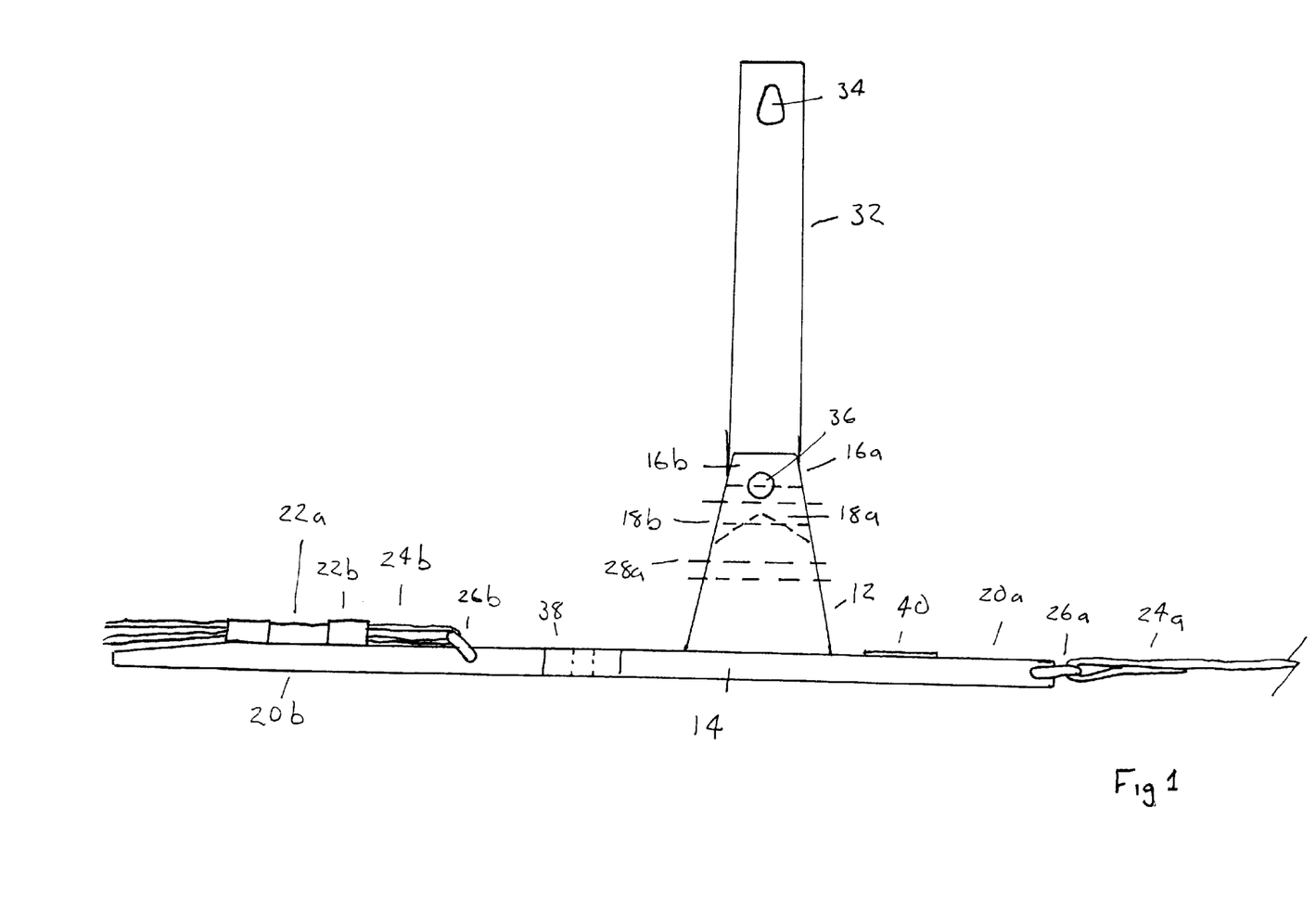
FIG. 1 is a side planar view of the fishing rod holding device of the present invention.
Figure 2:
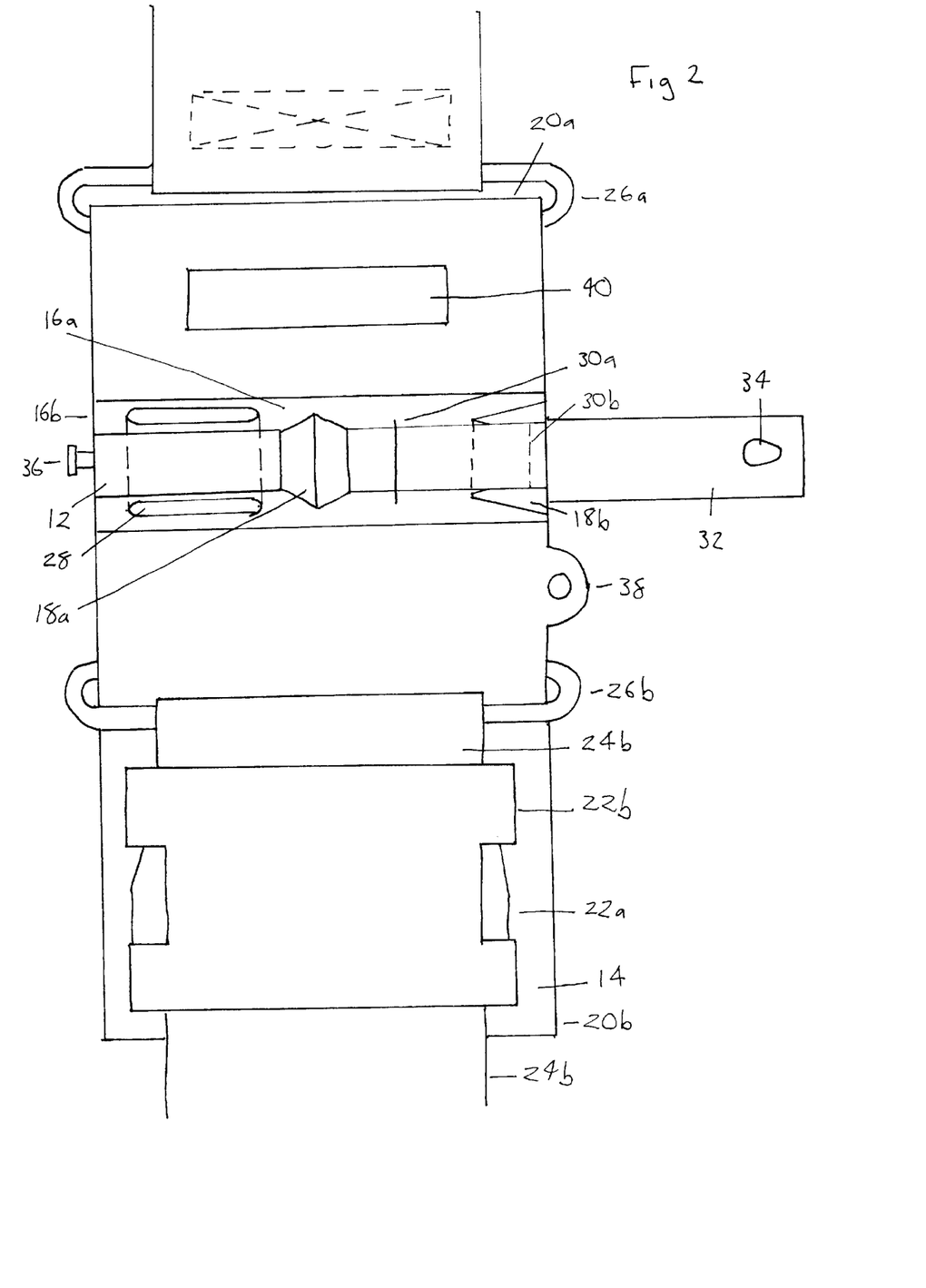
FIG. 2 is a perspective view of the fishing rod holding device of the present invention.

As seen in the drawings, in particular to FIG. 2, the substrate includes a rear wall that is secured to the base 14. This substrate can include any shape or configuration and as seen in the drawings, can be rectangular, trapezoidal or the like. Since the support will maintain a conventional fishing rod and will be exposed to outdoor elements and weather, the support is preferably fabricated for a rigid and durable, such as rubber, polymer, wood or the like.

Extending through front area 16a, opposite the rear wall is a first groove or channel 18a. This first groove or channel 18a is designed and configured to receive and maintain a fishing rod when the base is secured to a horizontal structure.

As seen in the figures, this first groove extends from the top edge to the bottom edge of the wall. A second groove or channel 18b extends through a side area 16b of the substrate. This second groove or channel 18b is designed and configured to receive and maintain a fishing rod when the base is secured to a vertical structure. These groove both the first and second, can include any shape, so long as these shapes can receive a rod or the like. The shapes that have proven to be successful are shown in the figures and this shape is the V-shape notch. It is to be understood by those skilled in the art that the groove or channels can also be rectangular, semicircular, or the like. If the substrate is not fabricated from a material, which inherently possesses anti-skidding properties, then the grooves 18a and 18b can be coated with a material which possess anti-skidding properties. Optionally, the grooves can include bumps or the like that are fabricated from anti-skidding material or can be roughened so add to add to the ability of maintaining the rod. This will be advantageous for maintaining the rods when wet and/or exposed to inclement weather. Thereby, providing for the purpose of the substrate to maintain and receive the fishing rods.

The base will partially wrap around the desired support and as such the base 14 is fabricated from a flexible yet resilient material. In use, the rear surface of the base will contact the desired support, vertical or horizontal. Thereby, providing for the rear surface to receive the particular support. Since the base is flexible, the flexibility will enable the base 14 to conform to the shape of the particular support. The base, like the support is preferably fabricated from a material that inherently possesses anti-skidding properties so as to prevent the base from slipping therefrom. Optionally, and as seen in FIGS. 1–3b, the rear surface of the support can include a plurality of ridges, bumps or the like, illustrated by not labeled. These bumps are fabricated from anti-skidding material and thus will aid and ensure that the base will be securely attached to the desired support, thereby preventing slippage therefrom. Optionally, the bumps can be eliminated and the rear surface can be roughened so as to provide for the same anti-skidding characteristics.

As seen in FIGS. 1–3b, the support 12 is secured to the base 14. The support acts as a divider and divides the base into two sections. The sections being a first section 20a and a second section 20b. Secured to the first section 20a is a first attaching device 22a and secured to the second section 20b is a second attaching device 22b. The first attaching device is adapted to mate with the second attaching device. These attaching devices are conventional, and thus can be any type or form. As seen in the drawings the attaching devices are straps 24a and 24b. The straps are preferably, but not limited to, nylon, cotton, polymer, or the like. The first strap includes opposite ends and the first end of the strap 24a is secured to the first section 20a. The securement can occur via any conventional means, such as the use of a groove located within the section, loops secured to the section, or optionally, as seen occurs via a ring 26a. This ring 26a is secured to the first end of the strap via conventional means. Thereby providing for the strap to be secured to the first section of the flexible base. Secured to the opposite end or second end of this particular strap 24a is a conventional locking device, such as a male/female buckle, male/female latch, hook and loop material, known as Velcro or the like.

Figures 3A, 3B:
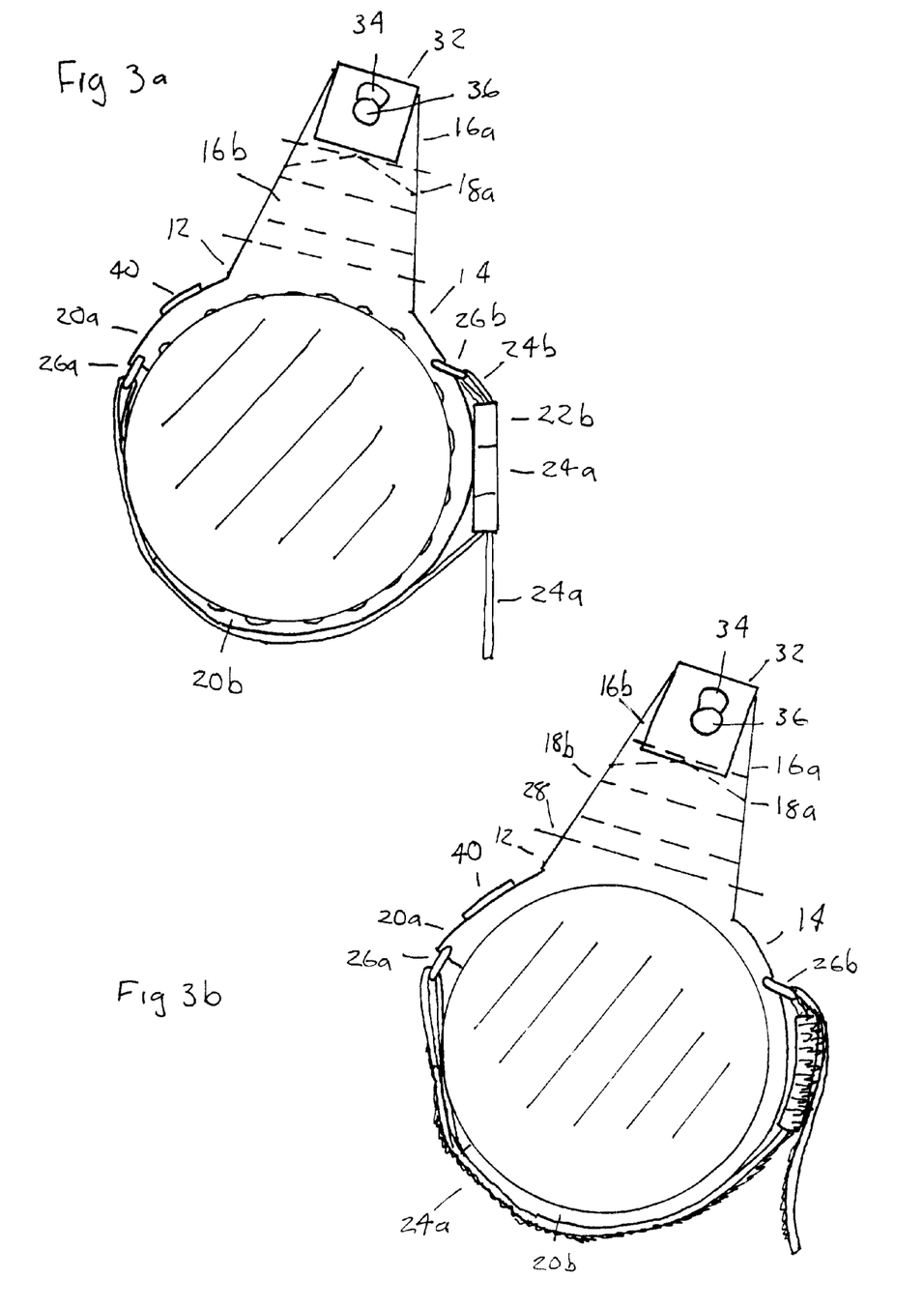
FIG. 3a is a side planar view of the fishing rod holding device of the present invention secured to a horizontal rail and illustrating one example for the locking device.
FIG. 3b is a side planar view of the fishing rod holding device of the present invention secured to a horizontal rail and illustrating another example for the locking device.

The second strap 24b, like the first strap, includes opposite ends and the first end of the second strap 24b is secured to the second section 20b. Preferably, the second strap is secured to the outer end of the second section. The securement occurs via any conventional means, and as illustrated a ring 26b has been used to produce favorable results. The securement can also occur via other conventional means, such as the use of a groove located within the section, loops secured to the section, or the like. Secured to the opposite end of second end of the second strap 24b is a conventional locking device that is adapted to mate with the first locking device, such as a male/female buckle, male/female latch, hook or loop material known as Velcro or the like. As seen, FIG. 3a illustrate conventional male/female latches as the locking device and FIG. 3b illustrates hook and loop material, such as the product known as Velcro as the locking device. To prevent rusting, all metal components, such as the rings if utilized, are fabricated from stainless steel.

Figure 4A:
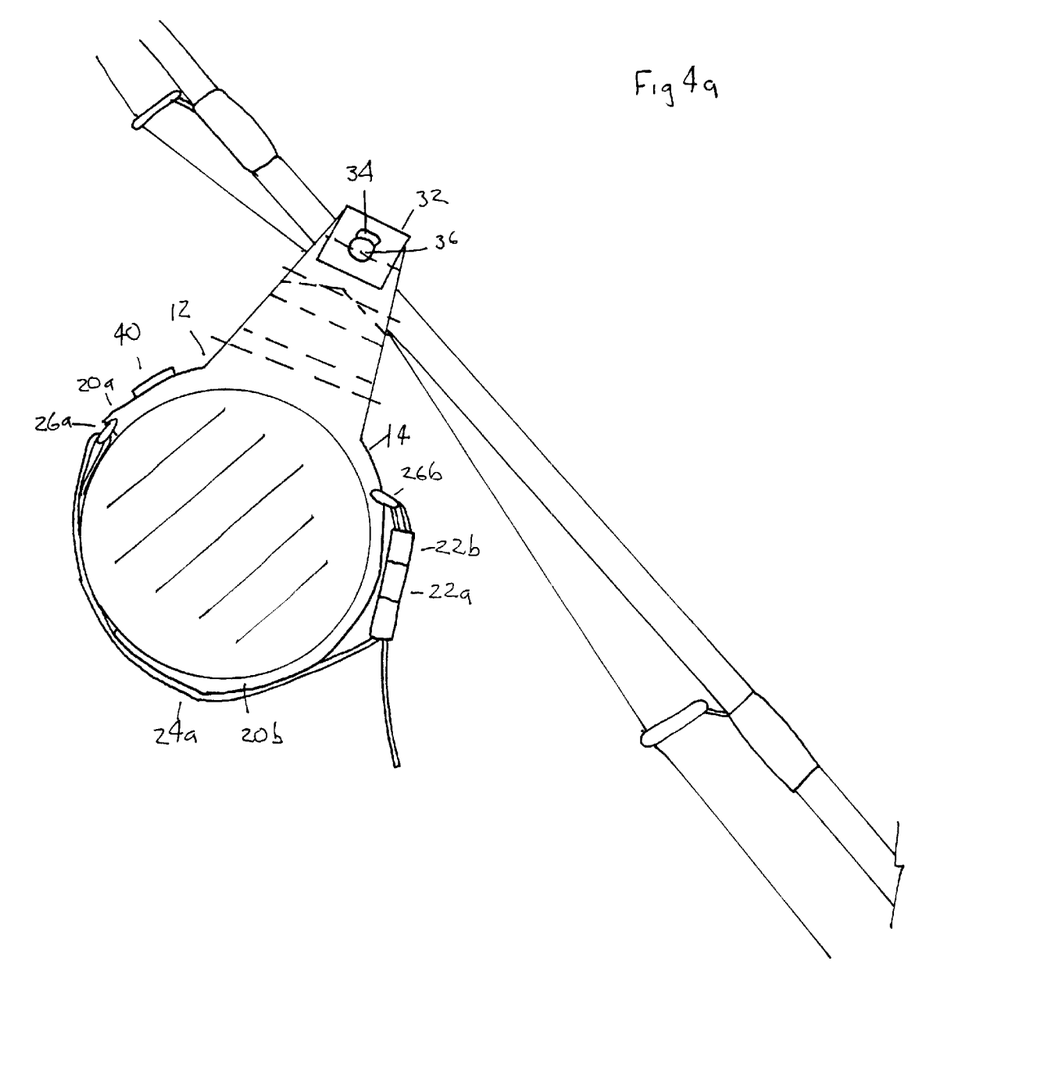
FIG. 4a is a side view of the fishing rod holding device of the present invention maintaining a conventional fishing rod and secured to a horizontal support.
Figure 4B:
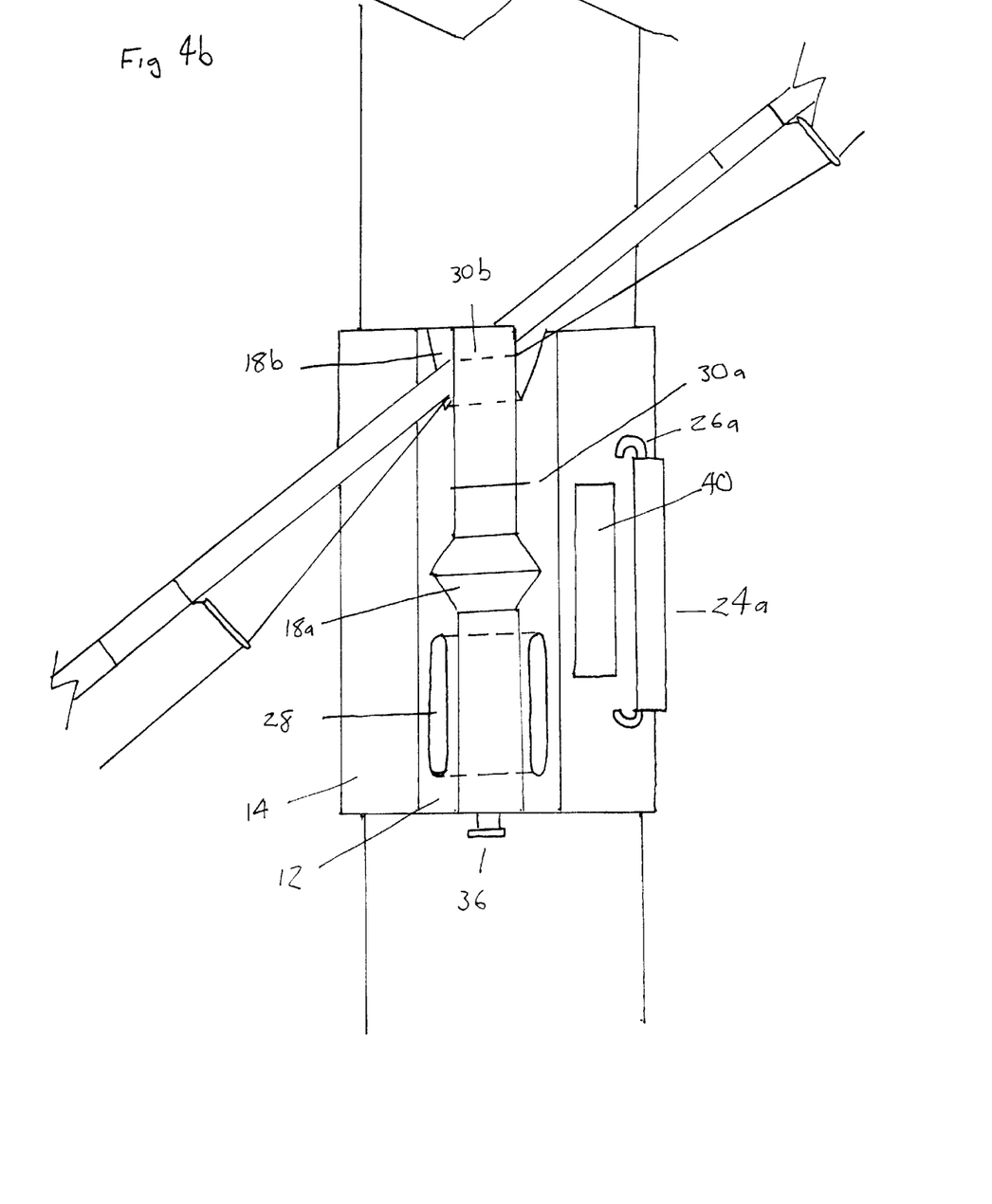
FIG. 4b is a front view of the fishing rod holding device of the present invention maintaining a conventional fishing rod and secured to a vertical support.

Hence, to utilize the present invention, in its simplest form, the user selects the desired support for maintaining the present invention. The support can be any vertical or horizontal structure. Once selected, the user places the rear surface of the base 14 against the support so as to provide for the substrate 12 to be facing outwardly therefrom. The straps are wrapped around the support and locked into place via the respective mating locking devices. Once in place, the user casts their rods and the rods are maintained within the respective groove or channel 18a for horizontal placement, as seen in FIG. 4a, or 18b for vertical placement as seen in FIG. 4b.

Enhancing the present invention 10 can be achieved by providing the holding device for allowing the fisherman to maintain necessary and desirable equipment. As seen in the drawings, an aperture 28 can extend from the top surface of the support to the bottom surface of the support. This aperture 28 can act as a holding device and can be used for maintaining a flashlight, beverage can/bottle, or the like and as such can be any shape. The oval shape that is shown in FIG. 2 is ideally suited for holding items, such as a flashlight, regardless of the position of the device, whether secured horizontally or vertically. Optionally, a second aperture, not illustrated can extend from one side wall to a second side wall for providing a second holding device and can be used for when the base is secured to a vertical support.

Another feature that can be added is the use of notches 30a and 30b, which are, located in proximity to each channel 18a and 18b, respectively. These notches 30a and 30b can maintain the line (outrigger clip) of the fishing rod.

For securing the fishing rod, as seen in FIGS. 2, 4a, 4b and 5, an additional strap 32 having an orifice 34 therein can be secured to any side wall of the substrate 12 while the opposite wall will include a stud or flange member 36. This configuration will enable the user to wrap the strap around the rod and place the orifice on the stud. Thereby providing for the strap to maintain the rod, while the flange member 36 maintains the strap.

Figure 5:
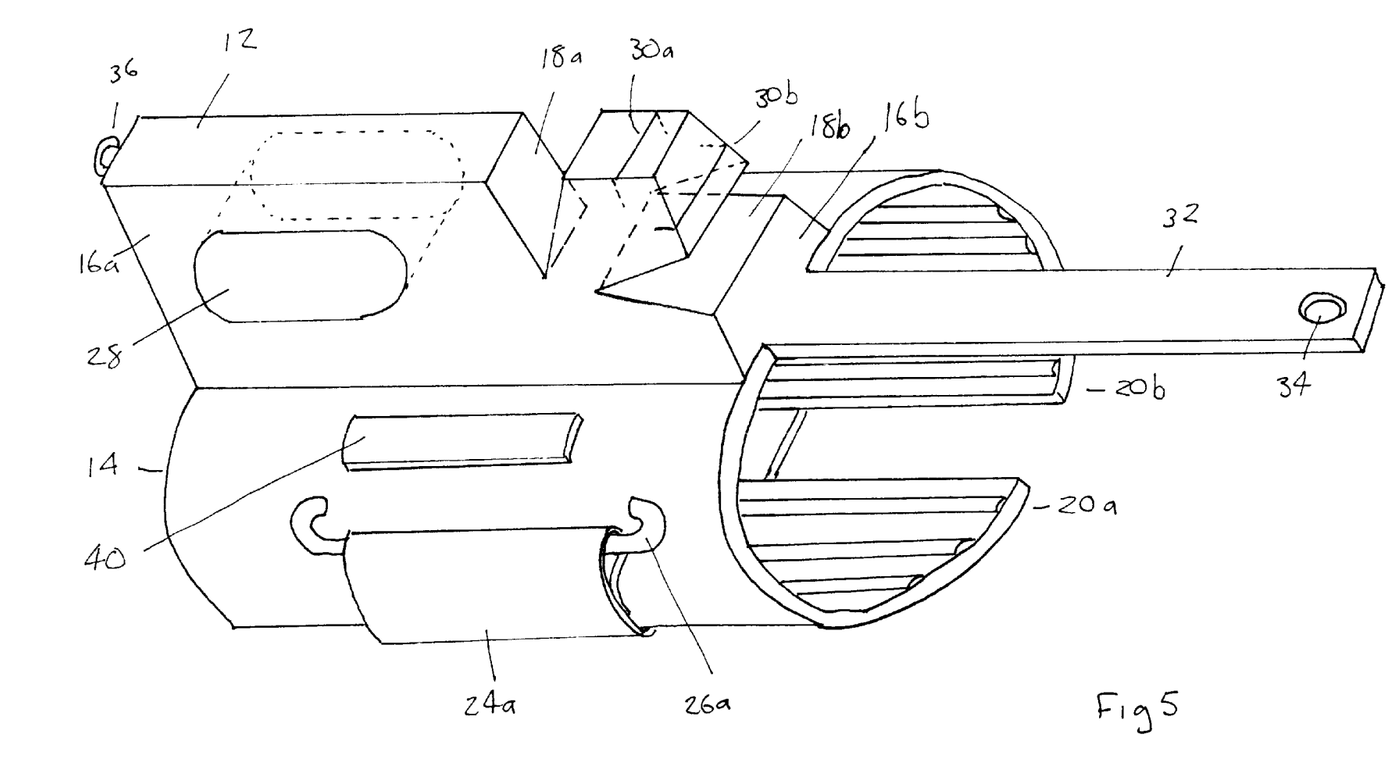
FIG. 5 is a top view of the fishing rod holding device of the present invention.
Figure 6:
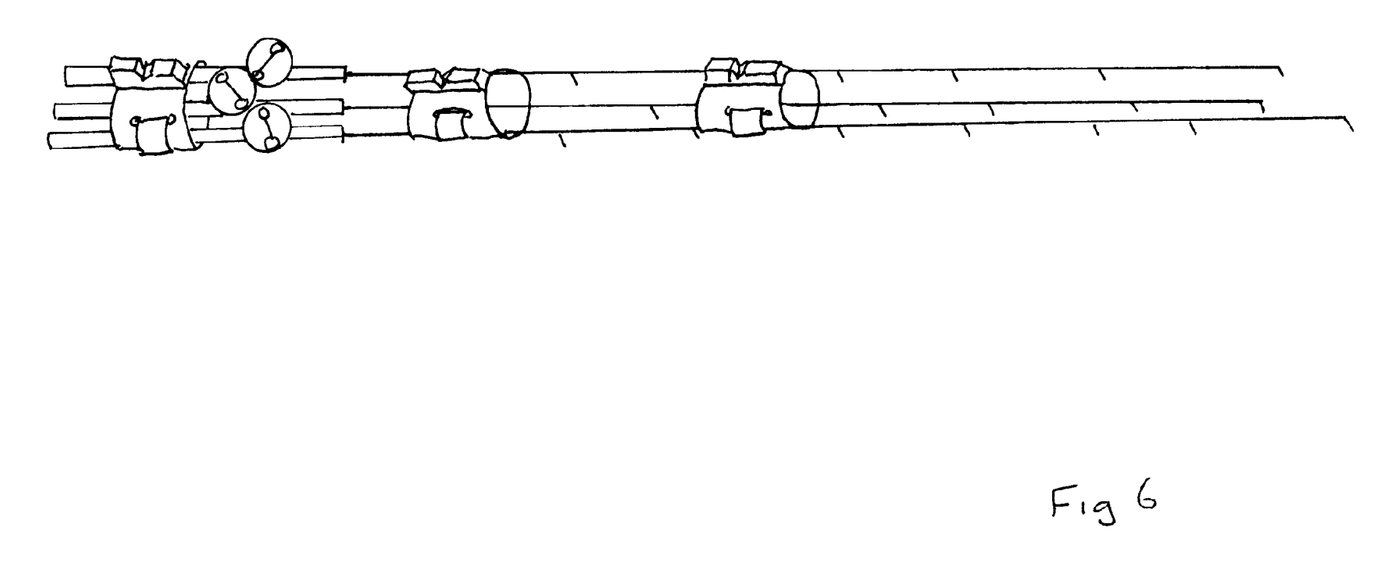
FIG. 6 is a perspective view of a plurality of fishing rod holding devices used to maintain a plurality of rods when the rods are not in use and when in a storable or transportable arrangement.

A tab 38 having an aperture therein, as seen in FIG. 5, for the rod leash can also be provided and can extend outwardly from any side wall of the substrate 12. Several tabs, as shown in FIG. 5 can also be provided for receiving hooks, lures, sun glasses or the like. Moreover, hooks or the like can also be used for receiving items that will aid the fisherman. In addition, at least one magnet 40 or the like, as shown throughout the figures, can be secured to the substrate or base for enabling metallic items, such as a knife, or the like, to be maintained thereon.

It is noted that the present describes one receiving instrumentality, wherein the receiving instrumentality being there groove or channel 18a or 18b extending through a side of the substrate 12. The present invention can be altered so that any number of grooves or channels can extend through the desired side of the substrate so as to enable a plurality of poles to be maintained via a singular unit. For example, in FIG. 2, additional grooves 18a can be added to the substrate to provide for a plurality of grooves extending through the front area of the substrate. In addition, the substrate can be enlarged so that additional grooves or channels 18b can be located on the side of the substrate. Thereby providing for a plurality of grooves 18b to be located along the side of the substrate. Each exposed side of the substrate can include grooves. Enabling the user to attach the present invention to the desired surface and always enables a groove to be accessible. Thereby providing for an additional groove to be located oppositely from side groove 18b.

Additionally, the present invention is also designed and configured to aid and assist a fisherman when in the process of carrying and/or storing a plurality of poles. The present invention, when stored or in the transportation mode can be wrapped around several poles. Since the present invention is designed to accommodate varying diameters of supports, it will easily accommodate the varying diameters of the poles at different lengths and thus will allow for a secured attachment.

This arrangement simplifies the process of storing and/or transporting the product by providing for a package that when secured forms a singular unit. This singular unit is simple to store and transport.

While the invention has been particularly shown and described with reference to an embodiment thereof, it will be understood by those skilled in the art that various changes in form and detail may be made without departing from the spirit and scope of the invention.

I claim:

1. A holding apparatus comprising:

a flexible base having a rear surface and a front surface;

attaching devices secured to said flexible base and enabling said flexible base to be secured to a desired vertical or horizontal disposed object;

a substrate secured to said front surface and extending outwardly therefrom, said substrate including a front section and side sections;

a first receiving instrumentality extending through said front section; and a second receiving instrumentality extending through the side section;

and wherein a holding strap is secured to said substrate and a locking element is located oppositely from said strap for enabling said strap to lock into place on said substrate.

2. A holding apparatus comprising:

a flexible base having a rear surface and a front surface;

attaching devices being secured to said flexible base and enabling said flexible base to be secured to a desired vertical or horizontal disposed object;

a substrate is secured to said front surface and extends outwardly therefrom;

said substrate includes a front section and side sections;

a first set of receiving instrumentalities extends through said front section and said first set of receiving instrumentalities comprises at least one receiving instrumentality; and a second set of receiving instrumentalities extends through said side section and said second set of receiving instrumentalities comprises at least one receiving instrumentality.

3. A holding apparatus as in claim 2 wherein said attaching devices comprises a pair of straps having mateable locking devices secured thereto.

4. A holding apparatus as in claim 2 wherein located in proximity to each receiving instrumentality is a slit.

5. A holding apparatus as in claim 2 wherein a holding strap is secured to said substrate and a locking element located oppositely from said strap for enabling said strap to lock into place on said substrate.

6. A holding apparatus as in claim 2 wherein a magnet is secured to said substrate.

7. A holding apparatus as in claim 2 wherein a magnet is secured to said base.

8. A holding apparatus as in claim 2 wherein at least one aperture extends through said base.

9. A holding apparatus as in claim 4 wherein said rear surface includes an anti-skidding element.

10. A holding device as in claim 4 wherein said substrate includes a third receiving instrumentality and said third receiving instrumentality extends opposite from said second receiving instrumentality.

11. A holding device as in claim 4 wherein a third set of receiving instrumentalities extends through said side section and said third set of receiving instrumentalities comprises at least one receiving instrumentality and said third set of receiving instrumentalities being located oppositely from said second set of receiving instrumentalities.

* * * * *